(No Model.) 5 Sheets—Sheet 1.
W. T. McNEELY.
DITCHING MACHINE.
No. 453,089. Patented May 26, 1891.
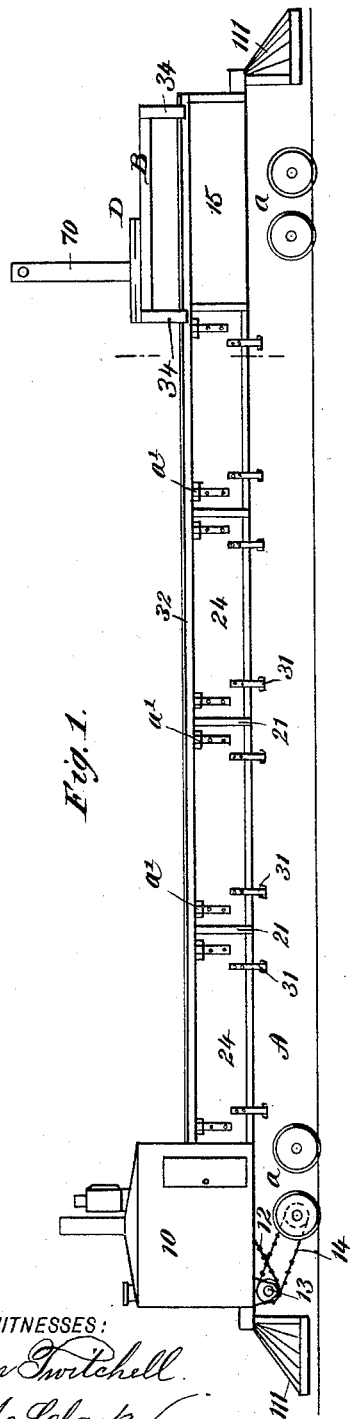
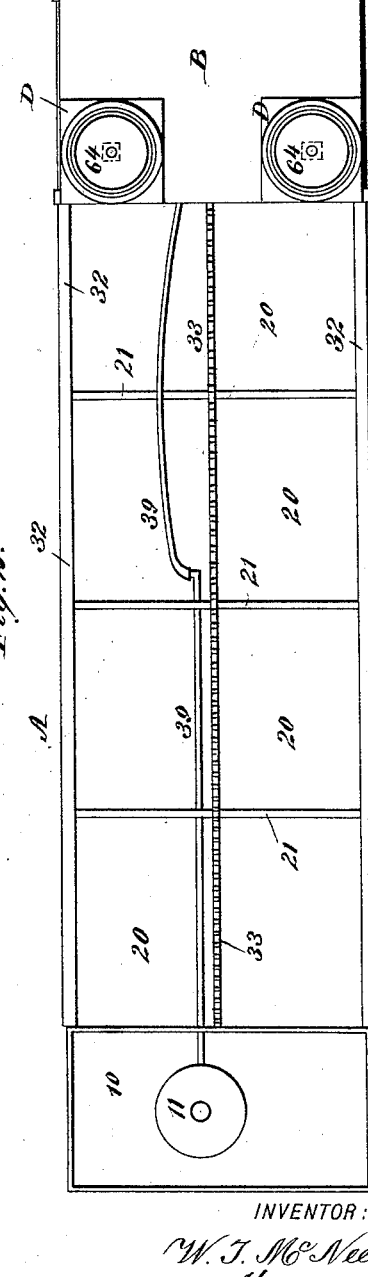
WITNESSES:
Donn Twitchell
E. M. Clark
INVENTOR:
W. T. McNeely
BY Munn & Co.
ATTORNEYS (No Model.)  W. T. McNEELY.  5 Sheets—Sheet 2.
DITCHING MACHINE.

No. 453,089.  Patented May 26, 1891.

WITNESSES:
Dow Twitchell
E. M. Clark

INVENTOR:
W. T. McNeely
BY Munn & Co
ATTORNEYS (No Model.) 5 Sheets—Sheet 5.
W. T. McNEELY.
DITCHING MACHINE.

No. 453,089. Patented May 26, 1891.

WITNESSES:
Dom Turtchell
E. M. Clark

INVENTOR:
W. T. McNeely
BY Munn & Co.
ATTORNEYS

UNITED STATES PATENT OFFICE.

WILLIAM T. McNEELY, OF RENO, ILLINOIS.

DITCHING-MACHINE.

SPECIFICATION forming part of Letters Patent No. 453,089, dated May 26, 1891.

Application filed July 21, 1890. Serial No. 359,362. (No model.)

*To all whom it may concern:*

Be it known that I, WILLIAM T. MCNEELY, of Reno, in the county of Bond and State of Illinois, have invented a new and Improved Ditching-Machine, of which the following is a full, clear, and exact description.

My invention relates to an improvement in ditching-machines especially adapted for railway-ditching, and has for its object to provide a machine of simple, durable, and economic construction, capable of use in railroading for ditching cuts, widening fills, or ditching the track outside of cuts where needed; and a further object of the invention is to so construct the machine that it may be utilized for carrying filling to points in the line of track wherein sags occur which are desired to be remedied.

Another object of the invention is to provide a machine capable of being effectively manipulated by a very limited number of workmen.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 3:
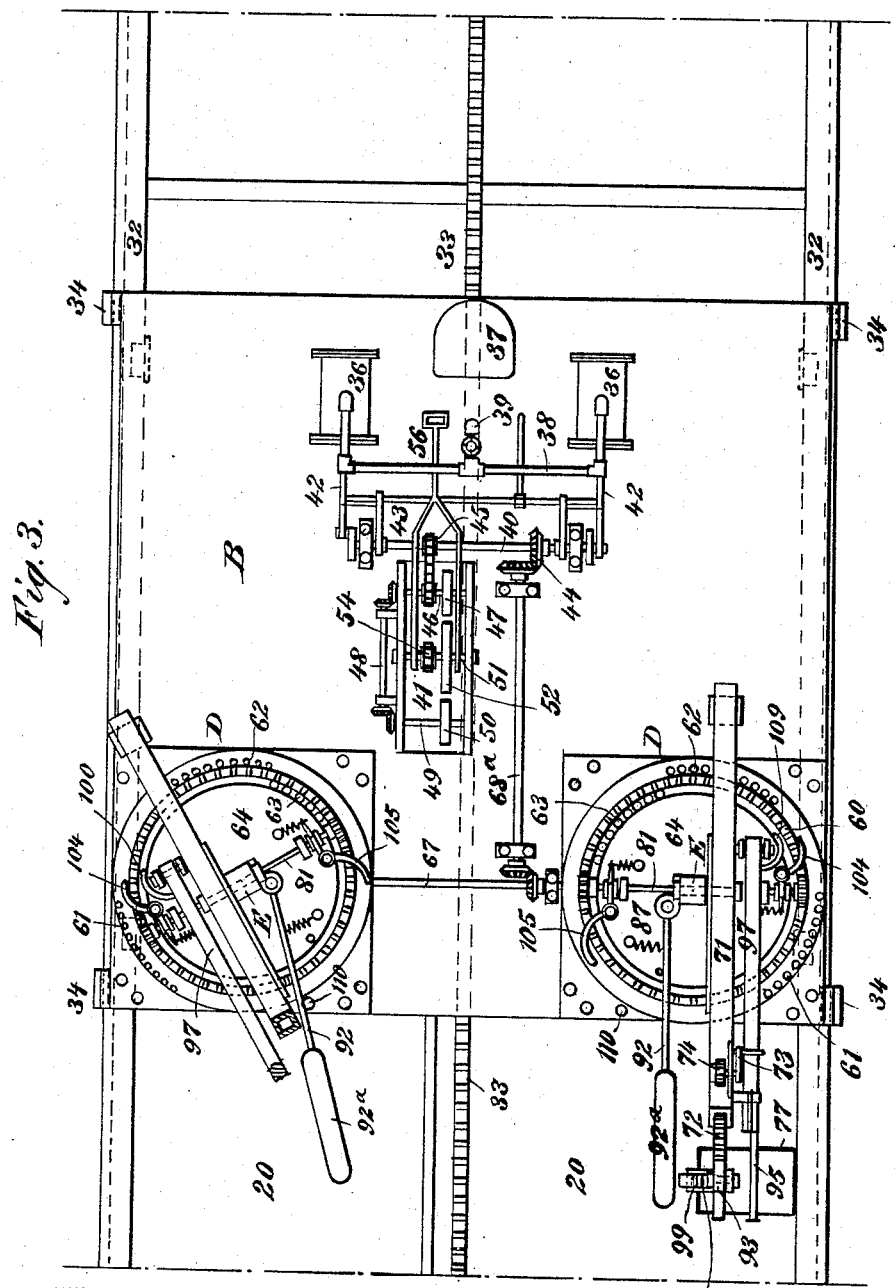
Figure 4:
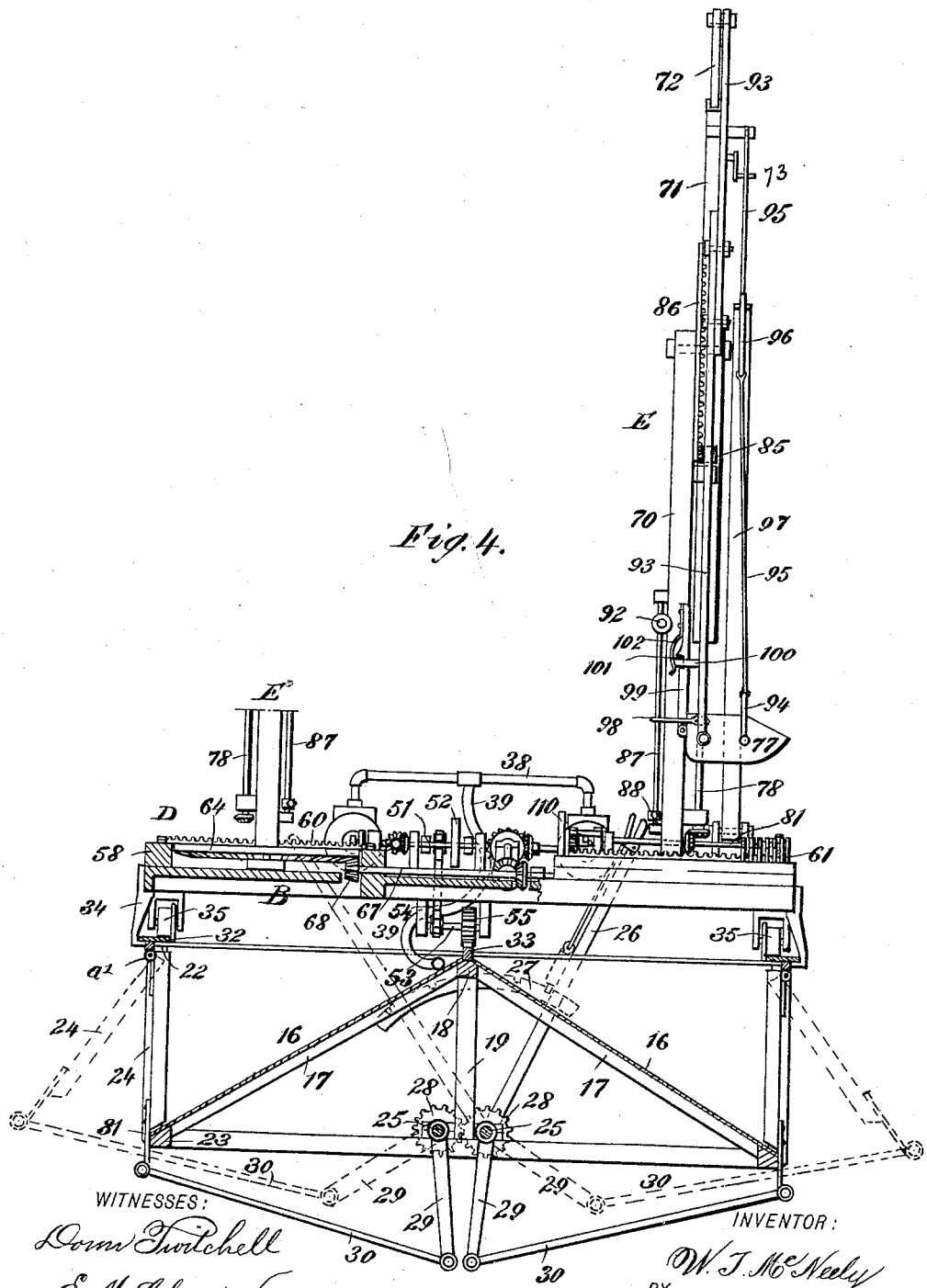
Figure 5:
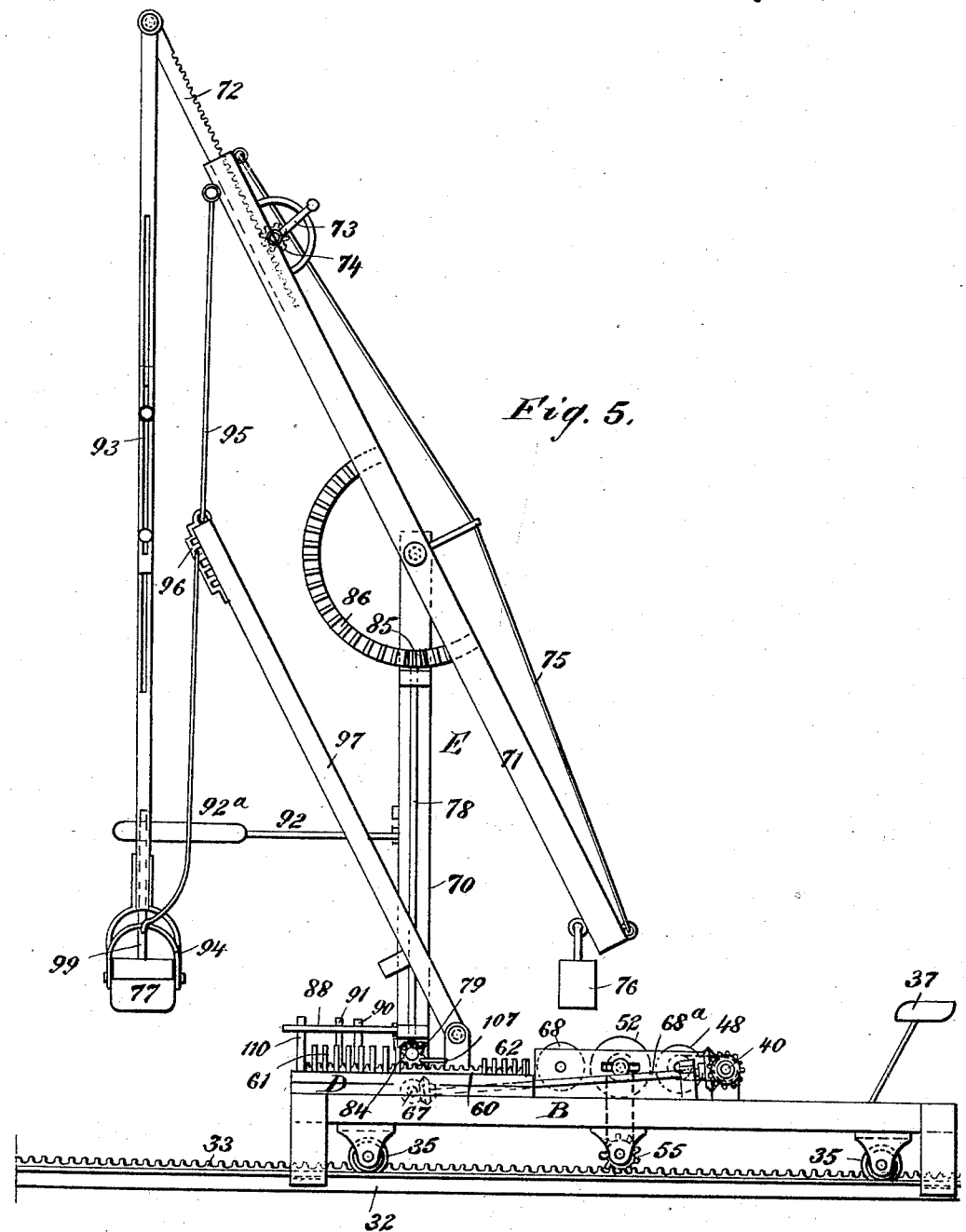
Figure 6:
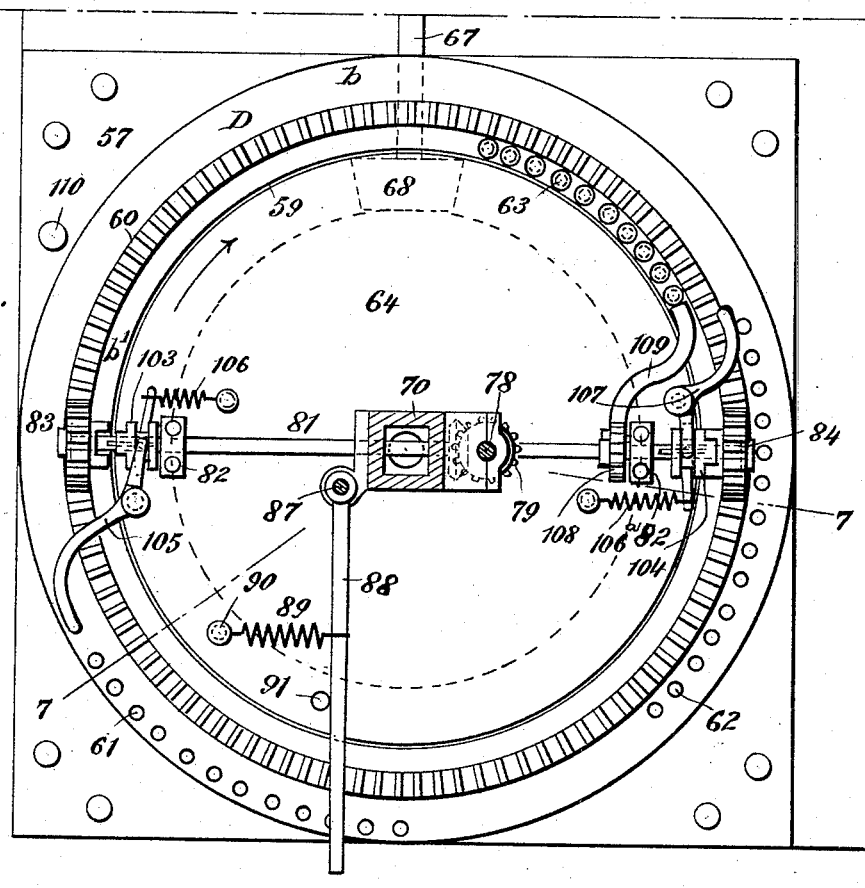
Figure 7:
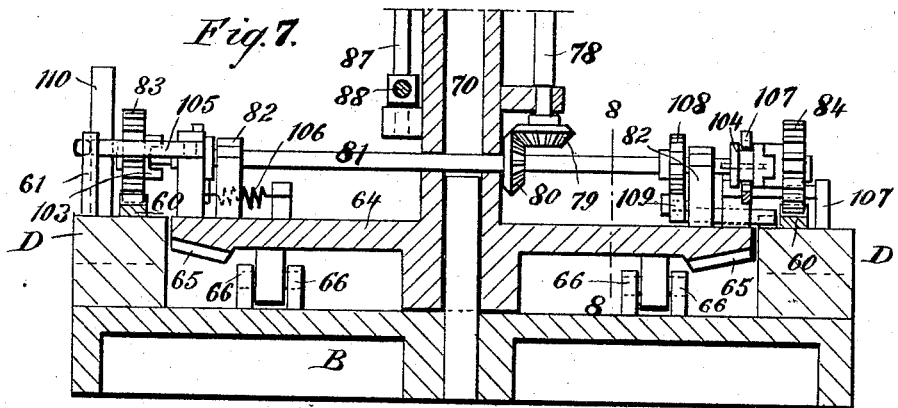
Figure 8:
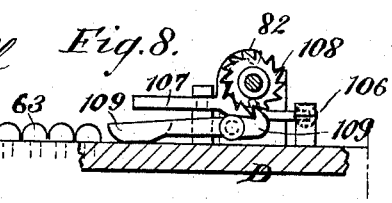

Figure 1 is a side elevation of the main structure, the raising and lowering mechanism for the bucket being only partially shown. Fig. 2 is practically a plan view of the structure shown in Fig. 1. Fig. 3 is a plan view of the ditching-platform, a portion of one derrick upon the platform being in section. Fig. 4 is a transverse section through the body of the machine and the platform carrying the cranes or derricks, the latter being in elevation. Fig. 5 is a side elevation of the platform and mechanism carried thereby. Fig. 6 is an enlarged plan view of one of the turntables and its surrounding mechanism, the derrick or crane being in horizontal section. Fig. 7 is a section taken on line 7 7 of Fig. 6, and Fig. 8 is a detail sectional view taken on the line 8 8 of Fig. 7.

In carrying out the invention a car A is employed, the body whereof may be of any desired length, which is mounted upon suitable trucks *a*. At the ends of the car-body the bottom is preferably flat, and at one of said ends a cab 10 is erected, adapted to contain any approved form of boiler 11, also an engine and reservoirs for water and fuel. Upon the cab a lantern provided with a suitable reflector is located, capable of being manipulated to throw light in the direction of either end of the car.

The car is propelled from the engine located in the cab through the medium of a belt connection 12 with a counter-shaft 13 and a second belt connection 14 between the counter-shaft and one or more of the car-axles, as shown in Fig. 1; but the motive power may be applied in any other approved manner, if preferred.

At the end of the car opposite the cab a compartment 15 is constructed, which when supplied with suitable doors may be utilized as a storage-room for tools, &c. The bottom of the car-body between the tool-compartment and the cab is inclined upward from each side to the center, as shown at 16 in Fig. 4, and the supporting-beams 17 of the bottom or floor are connected with a longitudinal beam 18, constituting the support at the apex of the floor, which longitudinal beam is in turn supported by proper uprights 19.

The car-body between the end structures is divided into a series of compartments 20 by transverse partitions 21, and between the upper and lower side beams 22 and 23 of the car-body said compartments are provided with doors 24. A door is located at each side of each compartment extending from one partition to the other, and the doors are all hinged to the upper side beams 22 in such manner as to open outward at their bottom edges, as shown by dotted lines in Fig. 4. The hinge connection of the doors is indicated upon the drawings by the letter *a'*.

At each side of the center of the car-body longitudinally below the floor 16 a rock-shaft 25 is journaled in any suitable or approved manner, one of which rock-shafts is provided with an attached lever 26, having a suitable thumb-latch adapted to engage with a rack 27, (best shown in Fig. 4,) which lever is located within the cab or at any other convenient point in the length of the car. The one lever operates both rock-shafts, as the said shafts are connected by meshing cogs 28. Each shaft is provided with a series of arms 29, projected therefrom, and to said arms links 30 are pivoted, which links are also attached in like manner to the lower extremities of rods or plates 31, rigidly secured to the outer faces of the doors at their lower edges, below which edges they extend, as illustrated in Figs. 1 and 4. Thus it will be observed that when the lever 26 is moved in one direction the doors are opened, and when moved in the opposite direction the doors are closed.

A track 32 is laid upon each upper side beam of the car-body, extending over the inner and outer faces thereof, and upon the apex of the floor 16 a longitudinal rack 33 is securely fastened, the teeth whereof are in its upper face.

The platform B, about the length of the compartments 20 and the width of the car-body, is adapted to travel upon the latter, the platform at its side edges being provided with angular guide bars or plates 34, whose lower ends engage with the outer under faces of the tracks 32, and the said platform is further provided with wheels 35, connected with its under face, the said wheels being adapted to support the platform and travel upon the upper faces of the tracks, as is clearly shown in Fig. 4.

Upon the platform, preferably near its inner edge, two steam-cylinders 36 are secured—one ordinarily at each side of a seat 37—the two cylinders being supplied with steam from a pipe 38, connected directly with them, which pipe receives its supply from the boiler in the cab through the medium of a main supply-pipe 39, located beneath the floor of the car. The said main supply-pipe is preferably flexible throughout the greater portion of its length, or it may be entirely of a flexible material. The steam-cylinders are intended to supply the power requisite to move the platform B backward and forward upon the car-body, as occasion may demand.

A drive-shaft 40, located at one end of an opening 41 in the platform, is connected directly with the piston-rods 42 of the cylinders, and the said drive-shaft is provided with any approved form of shifting mechanism 43, a bevel-gear 44, and a sprocket-wheel 45. The sprocket-wheel has a belt connection with a counter-shaft 46, journaled near one end wall of the opening 41, which shaft is provided between its ends with a friction-pulley 47 and a bevel-gear at one extremity meshing with a similar gear attached to a shaft 48, journaled at one side of the opening 41, the said shaft 48 being geared to a second transverse shaft 49, extending across the opening 41 and provided with an attached friction-wheel 50.

Between the transverse shafts 46 and 49 an intermediate parallel shaft 51 is located capable of lateral movement and provided with a friction-wheel 52, adapted for alternate engagement with the friction-wheels of the shafts 46 and 49. A lower shaft 53 is journaled in suitable bearings beneath the platform. Between the two shafts a belt connection 54 is made, and the lower shaft has secured thereto a pinion 55, adapted to travel upon the rack 33.

A shifting-yoke 56, placed within convenient reach of the seat 37, is attached to the upper intermediate shaft, whereby as the central friction-wheel is brought into engagement with the corresponding wheels at its front and rear the platform is made to travel forward or backward upon the car-body, as may be desired, and when the central friction-wheel is not engaged the platform remains stationary.

The main feature of the invention consists in the construction of the crane or derrick, the turret carrying the same, and the joint movements of the two.

Two turrets D are erected upon the platform B, located, preferably, in opposite corners. The construction of the turrets is identical, and the turrets consist, usually, of a plate 57, Figs. 6 and 7, bolted or otherwise secured at its corners to side and end blocks 58, which are in turn attached to the platform; but, if desired, the plate and blocks may be integral. The plate 57 is provided with a central circular opening 59, and upon its upper face, some distance from the edge of the opening, an annular rib 60 is produced, having a toothed upper face. Outside of the toothed rib a circle $b$ is formed, in which circle at opposite sides of a central line series of apertures are produced, and in each series of apertures a series of pins is introduced, designated, respectively, as 61 and 62, the pins 61 being longer than the pins 62. Upon the inner circle $b'$, intervening between the toothed rib and the inner edge of the plate 57, a series of preferably circular knobs or protuberances 63 is produced, which knobs are ordinarily made detachable, and one end knob of the series is located near and diagonally opposite to the end pin of the series 62 farthest removed from the series of pins 61, as is best shown in Fig. 6.

Within the opening of the turret-plate 57 a circular turn-table 64 is loosely fitted, pivoted at its center to the platform, and provided upon its under face at or near the periphery with bevel-teeth 65 and between its center and toothed surface with friction-rollers 66, held to travel upon the platform B and adapted to reduce the friction of the table when turning. The turn-tables of both turrets are driven from one shaft 67, having secured to its ends bevel-pinions 68, which mesh with the table-teeth 65. One turn-table revolves to the right and the other to the left. The drive-shaft 67 is driven from a counter-shaft 68$^a$, geared thereto and to the main drive-shaft 40, as shown in Figs. 3 and 5.

The upright 70 of the crane or derrick E is rigidly secured at its base to the center of the turn-table, the said upright being preferably rectangular in cross-section and hollow. The hoisting or lifting arm 71 of the derrick is fulcrumed at or near its center upon the upper end of the upright 70, and in the upper end of the said arm, which is hollow, a rack-section 72, constituting an extension of the arm, is held to slide, and is manipulated through the medium of a crank 73, attached to a shaft journaled upon the arm, which shaft is provided with an attached pinion 74, meshing with the rack, as is best illustrated in Fig. 5. The derrick-arm is ordinarily braced by a truss 75, and at its lower end a weight 76 is attached sufficiently heavy to about counterbalance the weight of the bucket 77, connected with the derrick-arm.

At one side of the derrick-standard 70 a vertical shaft 78 is journaled, the lower end of which shaft is provided with a bevel-wheel 79, which meshes with a similar wheel 80, fast upon a horizontal shaft 81, which shaft is journaled in bearings 82, secured to the upper face of the turn-table and in the base of the derrick-standard, through which base it passes, the shaft 81 being provided at its extremities with loosely-mounted pinions 83 and 84, which pinions engage with the toothed upper surface of the rib 60 of the turret-plate, as is clearly shown in Figs. 6 and 7. The upper end of the perpendicular shaft 78 has also attached thereto a bevel-pinion 85, which meshes with a toothed segment 86, the segment being attached to the lifting-arm 71 of the derrick, and the fulcrum of the said arm is the center of the circle, as is best shown in Fig. 5. The arm 77 of the derrick is raised and lowered through the medium of the perpendicular shaft 78 and the horizontal turret-shaft 81, the manipulation of the latter being reversed at intervals to impart proper movement to the arm, as will be hereinafter described.

Immediately opposite the perpendicular shaft 78 the extremities of a perpendicular bar 87 are journaled in suitable bearings integral with or projected from the derrick-standard 70, the body of the bar being preferably rectangular or polygonal in cross-section. At or near the lower end of the perpendicular bar 87 the inner extremity of a horizontal arm 88 is attached in such manner that the said arm is capable of vertical adjustment upon the bar. The arm 88 is of sufficient length to extend beyond the outer circle $b$ of the turret, as shown in Fig. 6, and the said arm has attached thereto one end of a spring 89, the other end of the spring being attached to a stud 90, fast to the turn-table, whereby the arm 88 is normally held in engagement with a stop-pin 91, and when in this position the arm 88 is at a right angle to the rod to which it is attached. At or near the upper end of the rod or bar 87 another arm 92 is secured in similar manner to the lower arm. The upper arm, however, is considerably longer, and it is provided with an enlarged outer section $92^a$, which section is laterally adjustable upon the body of the arm. The section $92^a$ is usually made of wood and the body of the arm of metal. The relative position of the two arms is best shown in Fig. 5.

The bucket 77 is pivoted between the members of the lower bifurcated end of a pendulum-rod 93, which rod is preferably constructed of a series of sections vertically adjustable one upon the other, whereby its length may be increased or diminished, as occasion may demand. The upper end of the pendulum-rod 93 is pivotally attached to the upper end of the rack-extension 72 of the derrick-arm 71. The bucket is fulcrumed from near its rear end, and between its center and the shovel-mouth of the bucket a bail 94 is pivoted to its sides, which bail has attached thereto a rope 95, which is carried upward in a slack manner and is secured at its upper end to a proper support at or near the top of the main body of the derrick-arm. In order to assist the bucket in its drop, and also to assist in elevating the same, the rope 95 is passed through one or more openings 96, produced in the upper end of a guide-arm 97, the lower end of which arm is hinged to the turn-table near the upright or standard of the derrick.

The bucket 77 has preferably attached at its rear a handle 98, and to the said rear portion of the bucket the lower end of a latch-bar 99 is hinged, which latch-bar is adapted to extend upward through a yoke 100, attached to the pendulum-rod 93 of the bucket, the said latch being provided with a recess 101 in its inner edge, as shown in Fig. 4, to receive the yoke, and a spring 102, attached to the latch-bar 99, is bent downward over the recess and has a bearing against the bow portion of the yoke, as is also best shown in Fig. 4. The spring 102 is so adjusted that when the bucket is loaded and struck the arm 92 $92^a$ disengages the bar 99 from the yoke 100 and allows the bar 99 to pass upward through the yoke, and the bucket thereupon turns upon its axis and dumps.

The turret-shaft 81 is provided with clutches 103 and 104 near its ends, which clutches are revolved with the shaft and are capable of lateral movement thereon, one of the clutches being adapted to enter the clutch-section, forming a portion of the hub of one of the pinions loosely mounted upon the extremities of the shaft. The clutch 103 is operated upon by a shifting-lever 105, fulcrumed at or near its center to the turn-table, the inner end of which shifting-lever engages with the clutch, and to the engaging member of the lever one end of a spring 106 is attached, the other end of the spring being secured to the turn-table, the tendency of the spring being to carry the clutch out of engagement with the clutch of the pinion 83. The outer end of the lever 105 is curved, as best shown in Fig. 6, and it is bent upward so as to engage with the pins 61 as the turn-table revolves, the elevation of the outer end of the lever being such that it is enabled to pass over the pins of the series 62 without touching them.

A shifting-lever 107, of similar construction to the lever 105, engages with the clutch 104, the inner end having also attached thereto a spring 106ª. The outer end of the lever 107 is also curved, but is of less altitude than the outer end of the lever 105. It is also shorter than the outer end of said lever, as the series of pins 62 is located nearer the toothed rib 60 than is the opposed series of teeth 61. Thus as the turn-table revolves the outer end of the lever 107 will engage with the pins 62, but will not touch the pins 61.

Near the lever 107 a ratchet-wheel 108 is secured to the turret-shaft 81, and to one of the journals or bearings 82 of the shaft a pawl 109 is journaled in such manner as to normally engage the under face of the ratchet-wheel, as illustrated in Fig. 8, and when one end of the pawl is in engagement with the ratchet-wheel the other end, which is the longer and heavier, rests upon the circular portion $b'$ of the turret-plate 57, the said end being outwardly curved for that purpose, as is best shown in Fig. 6. The pawl is at all times engaged by the ratchet and assists in supporting and maintaining the bucket, except when the lever 105 engages with the pins 61, which action takes place when the bucket is to be lowered to be filled, and when the lever 105 so contacts the outer end of the pawl 109 engages with the knobs 63 upon the turret-plate, and the outer extremity of the pawl is thereby elevated and the inner end depressed and disengaged from the ratchet-wheel. At this time only is the pawl disengaged from the ratchet-wheel, and this disengagement is caused by reason of the fact that the turret-shaft 81 revolves in one direction when the bucket is being raised and in the opposite direction when the bucket is being lowered.

In the operation of the machine, the bucket having been carried over the first compartment, for instance, and dumped, the turn-table, which moves continuously, causes the derrick to swing around to the side of the car, and at about the time the bucket has cleared the side the lever 105 engages with the pins 61 and throws the clutch 103 in mesh with the pinion 83, the opposite pinion 84 revolving loosely upon the turret-shaft, and at the moment the lever 105 engages with the pins 61 the pawl 109 is brought in contact with the knobs 63 and thrown out of engagement with the ratchet-wheel 108. The pinion 83 revolves the turret-shaft 81 in such manner that a rotary movement is imparted to the perpendicular derrick-shaft of a character to cause the upper pinion thereon, turning upon the segment 86, to throw the upper end of the derrick-arm downward. When the bucket reaches the workman, it is latched to place and filled, and as the bucket again approaches the side of the car the lever 105 leaves the pins 61 and the pawl leaves the knobs 63, whereupon the pawl again engages with the ratchet-wheel. At about this moment the lever 107 engages with the pins 62, throwing the clutch into mesh with the pinion 84, and the turret-shaft is revolved in an opposite direction, and through the medium of the derrick-shaft 78 acting upon the segment 86 the derrick-arm is elevated. When the bucket has been brought a sufficient distance upward, the lever 107 disengages from its pins 62 and both pinions 83 and 84 turn loosely upon the turret-shaft, the pawl serving to prevent the revolution of the turret-shaft, whereby the bucket is held in its elevated position. When the revolution of the turn-table shall have caused the trip-arm 88 to strike against a pin 110, located at one corner of the turret-plate, as shown in Fig. 5, which action occurs when the bucket is over the dumping-ground, the connected upper trip-arm 92 as the derrick turns is forced against the bucket-latch 99, disengaging the latch from the staple or keeper 100 of the bucket-pendulum rod 93, whereupon the weight of the material in the bucket dumps it. The above operations are repeated automatically as often as desired. The pins 61 and 62 are made removable in order that a sufficient number may be employed to provide for a greater or less ascent or descent of the bucket. The turret-plate may be constructed of removable sections, whereby the diameter of its circular opening may be increased or decreased by removing or by inserting sections, as the character of the work may require. The derricks are so set that one is a little in advance of the other. This is so planned in order that when the machine is in operation the derricks, arms, and buckets will not interfere, as the arm of one derrick will invariably follow the arm of the opposite derrick.

Having thus described my invention, I claim as new and desire to secure by Letters Patent—

1. In a machine of the character described, the combination, with a laterally-movable platform, of turrets secured to the said platform, turn-tables held to revolve in the turrets in opposite directions, and derricks secured to the said turn-tables, one derrick being in advance of the other, substantially as shown and described.

2. In a machine of the character described, the combination, with a vehicle-body divided into a series of compartments, a platform capable of lateral movement upon the vehicle over the compartments, and actuating mechanism carried by the vehicle and connected with the platform, of horizontally-aligning turrets secured to the platform, turn-tables held to revolve in the turrets in opposite directions, derricks secured to the turn-tables, and a bucket-elevating mechanism carried by the turn-tables connected with the derricks and tripped from the turrets, substantially as shown and described.

3. In a machine of the character described, the combination, with a carriage and a platform capable of lateral movement upon the same, of a turret provided with a circular rack, a turn-table held to revolve in the turret, a derrick secured to the turn-table, a shaft journaled upon the turn-table, pinions loosely mounted upon the shaft and engaging with the turret-rack, shifting-levers operated from the turret and pivoted upon the turn-table, and a gear connection between the shaft and the carrying-arm of the derrick, substantially as and for the purpose specified.

4. In a machine of the character described, the combination, with a carriage and a turret secured thereto provided with a circular rack and opposite series of circularly-arranged pins, of a turn-table held to revolve in the turret, a derrick secured to the table, a horizontal shaft journaled upon the table and passing through the derrick, pinions loosely mounted upon the extremities of the shaft, clutches held to slide upon the shaft, shifting-levers engaging with the clutches and operated by the turret-pins, and a connection between the shaft and the carrying-arm of the derrick, substantially as and for the purpose specified.

5. In a machine of the character described, the combination, with a carriage and a turret secured thereto provided with a circular rack and opposite series of circularly-arranged removable pins, of a turn-table held to revolve in the turret, a derrick secured to the turn-table, a horizontal shaft journaled upon the table and passing through the derrick, pinions loosely mounted upon the extremities of the shaft, clutch devices located upon the shaft, spring-controlled shifting-levers engaging with the clutch devices and also adapted for engagement with the turret-pins, and a connection, substantially as shown and described, between the shaft and the arm of the derrick, as and for the purpose specified.

6. In a machine of the character described, the combination, with a stationary turret provided with a circular rack and a turn-table held to revolve in the turret, of a derrick secured to the turn-table, a shaft journaled upon the turn-table and passing through the derrick, provided with loosely-mounted pinions engaging with the turret-rack, clutch devices located upon the shaft, opposed series of removable pins located upon the turret, spring-controlled shifting-levers pivoted upon the turn-table, the said levers being provided with outwardly-extending arms for engagement with the turret-pins, and a connection between the shaft and the arm of the derrick, substantially as shown and described.

7. In a machine of the character described, the combination, with a stationary turret provided with a circular rack and a turn-table held to revolve in the turret, of a derrick secured to the turn-table, a shaft journaled upon the derrick and provided with loosely-mounted pinions engaging with the rack, clutch devices located upon the shaft, opposed series of removable pins located upon the turret and circularly arranged, one series of pins being longer than the other, shifting-levers fulcrumed upon the turn-table and provided with outwardly and upwardly curved ends of differing length and altitude and adapted for engagement with the pins, and a connection, substantially as described, between the shaft and the carrying-arm of the derrick, as and for the purpose specified.

8. In a machine of the character described, the combination, with a stationary turret provided with a circular rack and a turn-table held to revolve in the turret, of a derrick secured to the turn-table, a horizontal shaft journaled upon the table and passed through the derrick, pinions loosely mounted upon the extremities of the shaft, clutch devices held to slide upon the shaft, and a ratchet-wheel secured to the shaft, opposed series of pins located upon the turret outside of the rack and knobs produced upon the turret inside of the rack, shifting-levers pivoted upon the table, connected with the clutch devices and adapted for engagement with the pins, a weighted pawl engaging with the ratchet-wheel of the shaft, the weighted arm of which pawl is adapted for engagement with the turret-knobs, and a connection between the shaft and the carrying-arm of the derrick, as and for the purpose specified.

9. In a machine of the character described, the combination, with a fixed turret provided with a circular rack and a turn-table held to revolve within the turret, of a derrick secured to the turn-table, a shaft journaled upon the turn-table, provided with loosely-mounted pinions at its extremities engaging the turret-rack, shifting-levers fulcrumed upon the turn-table and actuated from the turret, a segment attached to the carrying-arm of the derrick, and a shaft journaled upon the derrick and geared with the shaft of the turn-table and the segment of the derrick-carrying arm, substantially as shown and described.

10. In a machine of the character described, the combination, with a turret provided with a circular rack, a turn-table held to revolve in the turret, and a derrick secured to the turn-table, of a shaft journaled upon the turn-table and passed through the derrick, pinions loosely mounted upon the extremities of the shaft, opposed series of circularly-arranged pins located upon the turret, shifting-levers fulcrumed upon the turn-table and adapted to be tripped by the pins, a segmental gear attached to the carrying-arm of the derrick, and a gear connection between the segmental gear and the shaft of the turn-table, as and for the purpose specified.

11. In a machine of the character described, the combination, with a turret provided with a circular rack, knobs produced thereon inside of the rack and opposed series of removable pins located upon the turret outside of the rack, a turn-table held to revolve in the turret, and a derrick secured to the turn-table, of a shaft journaled upon the turn-table, extending from end to end thereof and provided with loosely-mounted pinions upon its extremities adapted for engagement with the rack, clutch devices held to slide upon the rack, spring-controlled shifting-levers fulcrumed upon the turn-table and adapted for engagement with the turret-pins, a ratchet-wheel secured to the shaft, a pawl engaging the ratchet, weighted at one end and adapted for engagement with the turret-knobs, a segmental gear attached to the carrying-arm of the derrick, and a shaft journaled upon the derrick having gear connection with the said segmental gear and the shaft of the turn-table, as and for the purpose specified.

12. In a machine of the character described, the combination, with a turn-table and a fixed structure surrounding the table provided with an upwardly-extending pin, of a derrick secured to the turn-table, a bucket suspended from the carrying-arm of the derrick, a yoke projected from the pendent rod of the bucket, a latch hinged to the rear of the bucket and extending upward through the yoke, a bar held to turn in bearings upon the derrick, an arm secured to the lower end of the bar adapted for engagement with the said pin, and a second arm attached near the upper end of the bar adapted to engage with the bucket-latch and disengage said latch from its yoke, substantially as and for the purpose specified.

13. In a machine of the character described, the combination, with a derrick, of a carrying-arm pivoted thereon, a rack held to slide in the upper end of the arm, a sectional rod pivoted to the rack, and a bucket pivoted to the lower end of the sectional rod, as and for the purpose specified.

14. In a machine of the character described, the combination, with the upright of a derrick, a carrying-arm pivoted thereon tubular at its upper end, and a rack held to slide in the tubular extremity of the arm, of a sectional vertically-adjustable rod pivoted to the upper end of the rack, a bucket pivoted to the lower extremity of the rod, a tension-beam hinged at its lower end and located near the derrick-standard provided with openings at its upper end, and a rope attached to the bucket-bail extending upward through the openings at the end of the tension-beam, the upper end of which rope is attached to the carrying-arm of the derrick, substantially as and for the purpose specified.

15. In a machine of the character described, the combination, with the upright of a derrick, a carrying-arm pivoted thereon tubular at its upper end, and a rack held to slide in the tubular extremity of the arm, of a sectional vertically-adjustable rod pivoted to the upper end of the rack, a bucket pivoted to the lower end of the rod, a tension-beam hinged at its lower end located near the derrick-standard and provided with openings at its upper end, a rope attached to the bucket-bail extending upward through the openings at the end of the tension-beam, the upper end of which rope is attached to the carrying-arm of the derrick, and a weight attached to the lower end of the derrick-arm adapted to counterbalance the weight of the empty bucket, as and for the purpose set forth.

16. In a machine of the character described, the combination, with a turn-table, a derrick secured to the said turn-table, a carrying-arm pivoted to the derrick, and a toothed segment surrounding the pivotal point of the arm and secured thereto, of a bucket pendent from the upper end of the carrying-arm, a tension-beam hinged to the turn-table and provided with openings at its upper end, a rope attached to the bail of the bucket, passed upward through the openings in the tension-beam, and secured to the upper end of the derrick-arm, a drive-shaft held to revolve upon the turn-table, a vertical shaft journaled upon the standard of the derrick, and a gear connection between the vertical shaft and the turn-table shaft and the vertical shaft and the toothed segment, as and for the purpose specified.

17. In a machine of the character described, the combination, with a turn-table, a fixed structure surrounding the turn-table and provided with an upwardly-extending pin, a derrick fast to the turn-table, a carrying-arm pivoted to the derrick, a toothed segment attached to the carrying-arm around its pivotal point, a vertically-adjustable rod pendent from the upper end of the arm, and a bucket pivoted to the lower end of the rod, of a keeper extending rearward from the bucket-rod, a latch provided with a spring, hinged to the bucket and extending upward through the keeper, a bar held to turn in bearings upon the standard of the derrick, an upper and a lower arm adjustable upon the said bar, the lower arm being adapted for engagement with the pin of the said structure and the upper arm adapted for engagement with the bucket-latch, a drive-shaft journaled upon the turn-table, and a gear connection between the said drive-shaft and the segment of the derrick-arm, as and for the purpose set forth.

18. In a machine of the character described, the combination, with a carriage provided with a rack extending from end to end of the same, of a platform held to travel upon the carriage, provided with a pinion adapted to engage with the rack, mechanism, substantially as shown and described, for operating the pinion, turrets fixed to the platform, turn-tables located within the turrets, derricks secured to the said turn-tables, and a connection between the turn-tables and the driving mechanism of the platform, as and for the purpose set forth.

WILLIAM T. McNEELY.

Witnesses.
PHILLIP H. WEBER,
MILES A. HUGHEY.